(12) United States Patent
MacMillan

(10) Patent No.: US 6,590,023 B2
(45) Date of Patent: Jul. 8, 2003

(54) METHOD FOR TREATING COATING FORMULATIONS

(75) Inventor: David S. MacMillan, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 89 days.

(21) Appl. No.: 09/813,678

(22) Filed: Mar. 21, 2001

(65) Prior Publication Data

US 2001/0035379 A1 Nov. 1, 2001

(51) Int. Cl.$^7$ ................................. C08K 3/04
(52) U.S. Cl. ................ 524/495; 528/480; 528/482; 528/490
(58) Field of Search ................ 528/480, 482, 528/490; 524/495

(56) References Cited

U.S. PATENT DOCUMENTS

| | | | |
|---|---|---|---|
| 4,765,923 A | 8/1988 | Walterick, Jr. | |
| 5,516,885 A | 5/1996 | Gorzynski et al. | |
| 6,056,855 A | 5/2000 | Amey | |

FOREIGN PATENT DOCUMENTS

| | | |
|---|---|---|
| CA | 2180971 | 1/1997 |

*Primary Examiner*—Edward J. Cain
*Assistant Examiner*—Katarzyna I Wyrozebski Lee
(74) *Attorney, Agent, or Firm*—David E. LaRose; John A. Brady

(57) ABSTRACT

A method of making a coating formulation prior to its introduction onto a web to be printed by an ink jet printer. The method includes the steps of: determining the nature and amount of undesirable substances in a component of the coating formulation, adjusting the pH of the component, contacting the pH adjusted component with a first activated carbon material, filtering the thus treated component, contacting the thus treated component with a second activated carbon material, and filtering the thus treated component and combining it with other components of the coating formulation to yield a treated coating formulation having a reduced amount of the undesirable substances.

11 Claims, No Drawings

METHOD FOR TREATING COATING FORMULATIONS

FIELD OF THE INVENTION

The invention relates to methods for treating components of coatings for paper for ink jet printing applications and in particular, to the manufacture of coatings of the type used to enhance ink drying and produce higher quality printed images so that the coatings contain reduced amounts of undesirable substances.

BACKGROUND OF THE INVENTION

Ink jet printing methods utilize printheads having orifices which eject ink droplets onto a print medium. For higher quality, higher resolution printing applications, the orifices of the printheads have been increased in number and their diameter significantly reduced in size. Accordingly, for full color printed images, inks are formulated to include dyes and/or pigments and various carriers and/or solvents which are resistant to drying or otherwise clogging the nozzle holes of the printhead. Such ink formulations, however often adversely affect the properties of the ink deposited on the print medium resulting in longer drying times and/or color mixing or bleeding of the images resulting in poorer quality images.

Various print media may be used for ink jet printing applications depending on the ink formulations. Such media include cellulosic webs, synthetic papers, polymeric films and the like. As advances in ink jet printing have occurred, specialty papers containing exotic coatings have been developed. Such specialty papers are often more expensive than uncoated papers and may contain coatings which are not compatible with the wide variety of ink formulations being used or developed for ink jet printing applications.

Despite the abundance of specialty webs for ink jet printing, cellulosic webs remain the most widely used print media. Cellulosic webs are made by conventional paper making techniques wherein a fibrous pulp is deposited on a wire screen and dried to form a web. Accordingly, the webs contain minute pores or voids between the cellulosic fibers for absorption of liquids therein. The porosity of the webs may be changed by use of additives such as clays and the like which may change the hydrophilic properties of the webs so that the webs absorb or repel aqueous and/or organic fluids which may be used as carrier fluids in ink formulations.

Ideally, it is desirable for only the carrier fluid of the ink formulation to penetrate into the web thereby depositing colorant on the outer surface of the web. Balancing the properties of the ink formulations so that the formulations are adaptable for use with a wide variety of print media is extremely difficult. It is even more difficult to provide ink formulations which may be used on uncoated or plain paper webs. Print medium adaptable to accept improved dye and/or pigment based ink formulations has been achieved by coating the medium, generally paper, with coatings based on an aqueous polymer of epichlorohydrin and dimethylamine, preferably just prior to printing. However, it has been discovered that paper coated in this manner can contain undesirable substances and have an unpleasant odor. Accordingly a need exists for a manner of treating coating formulations of this type to remove undesirable substances and reduce undesirable odor characteristics.

SUMMARY OF THE INVENTION

With regard to the above and other objects and advantages thereof, the invention relates to a method for reducing the amount of undesirable components in a polyamine coating formulation to provide a coating formulation having a substantially undetectable odor and less than about 1 ppm chlorinated compounds.

In a preferred embodiment, the method includes the steps of:

(a) adjusting the pH of one or more components of the coating formulation having the undesirable substances to a pH in the range of from about 8.0 to about 9.0.

(b) contacting each pH adjusted component with an activated carbon material, the activated carbon material being present in an amount of from about 0.5 to about 2.0% (wt/wt).

filtering each treated component and combining same with other components to yield a treated coating formulation having a substantially undetectable odor and less than about 1 ppm chlorinated compounds.

In another aspect, the invention provides a method of treating a coating formulation prior to its introduction onto a web to be printed by an ink jet printer.

In a preferred embodiment, the method includes the steps of:

a) determining the nature and amount of undesirable substances in a polyamine component of the coating formulation, b) adjusting the pH of the component, c) contacting the pH adjusted component with a first activated carbon material, d) filtering the thus treated component, e) contacting the thus treated component with a second activated carbon material, and f) filtering the thus treated component and combining it with other components of the coating formulation to yield a treated coating formulation having a reduced amount of the undesirable substances.

The components of the coating formulations preferably treated in accordance with the invention are aqueous polymers of epichlorohydrin and dimethylamine to control ink permanence on the printed web. Such components, if untreated, typically exhibit undesirable odor characteristics and contain undesirable substances including chlorinated hydrocarbons.

The invention advantageously enables substantial removal of the unpleasant odor characteristics and the undesirable substances.

DETAILED DESCRIPTION OF THE PREFERRED EMBODIMENTS

The invention relates to methods for treating formulations of the type which are coated onto cellulosic webs, preferably immediately prior to printing, in order to promote ink drying and color fastness and reduce ink smearing and/or bleeding. Treatment of the formulations in accordance with the invention removes undesirable substances from the formulations and/or reduces undesirable characteristics such as unpleasant odor. Formulations particularly suited for treatment in accordance with the invention are coating formulations provided by an aqueous polymer of epichlorohydrin and dimethylamine.

In this regard, it is noted that the treatment is directed to treating the aqueous polymer component of a coating formulation prior to combining it with other components of the coating formulation. However, as treating the aqueous polymer component affects characteristics of the coating formulation, treatment of the aqueous polymer component is sometimes referred to herein as treatment of the coating formulation. Thus, quantities referred to herein, e.g., % (wt/wt), refer to relative amounts with regard to the aqueous polymer component.

For the purpose of example, preferred coating compositions which have been observed to be particularly suitable for treatment in accordance with the invention are described herein. As will be shown, these compositions may be treated in accordance with the invention to remove undesirable substances and undesirable characteristics, such as unpleasant odor.

PREFERRED COATING FORMULATIONS

For the purpose of example only, it is noted that preferred formulations for treatment in accordance with the invention may include a polyhydric alcohol selected from the group consisting of glycol-based solvents having a surface tension ranging from about 25 to below about 45 dynes/cm, such as 1,2-propanediol, dipropylene glycol, tripropylene glycol, and the like as well as mixtures of such solvents having desired surface tension properties.

It has been observed that the method of the invention is particularly suitable for treating such formulations having the glycol-based solvent present in the coating formulation in an amount of from about 25 to about 96 percent by weight of the formulation, preferably from about 25 to about 75 percent by weight and most preferably from about 25 to about 60 percent by weight of the formulation. For example, 100 percent by weight 1,2-propanediol and a mixture containing from about 75 to about 100 percent by weight 1,2-propanediol and from about 0 to about 25 percent by weight dipropylene glycol.

Such exemplary coating formulations may also include a polyvalent metal salt, preferably a water soluble salt, and an organic acid. Such salts often contain a polyvalent metal cation, e.g., $Ca^{2+}$, $Cu^{2+}$, $Ni^{2+}$, $Mg^{2+}$, $Zn^{2+}$, $Ba^{2+}$, $Al^{3+}$, $Fe^{3+}$ and $Cr^{3+}$, and an inorganic or organic anion component such as may be selected from a nitrate group, a chlorate group, a carboxylate group and a halogen ion such as $Cl^-$, $I^-$ and $Br^-$.

The organic acid, for example, may be a hydroxy acid selected from the group consisting of lactic acid, glycolic acid, citric acid and malic acid. A particularly preferred organic acid for use in the formulation is citric acid. The polyvalent metal salt or organic acid in the coating formulation generally ranges from about 0.25 to about 20 percent by weight of the formulation.

Such coating formulations often also include an amine polymer, such as a cationic amine polymer. The amine polymer normally has a number average molecular weight ($MW_N$) ranging from about 2,000 to about 250,0000, most typically from about 2,000 to about 10,000 $MW_N$, and more commonly from about 7,500 to about 10,000 $MW_N$. An example of an amine polymer is a cationic amine polymer having the following structure:

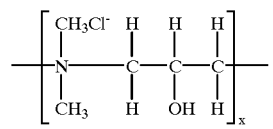

wherein x is an integer ranging from about 15 to about 2000. Such polyamines include cationic polyamines derived from dimethylamine and epichlorohydrin such as the polyamine available from Cytec Industries, Inc. of West Paterson, New Jersey under the trade name SUPERFLOC C-567. Other examples of useful amine polymers are available from Cytec Industries, Inc. under the trade name SUPERFLOC C-572 and SUPERFLOC E-4217.

As mentioned previously, the component treated in accordance with the invention is the amine polymer component. Treatment of this component results in removal of undesirable substances and odor. The treated component is then combined with other components to yield a coating formulation. The resulting coating formulations generally contains from about 1 to about 20 percent by weight of the amine polymer.

The coating formulations also generally include a surfactant, for example a non-hydrolyzable copolymer based on polydimethylsiloxane, having a general structure as follows:

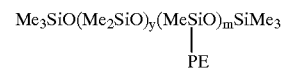

wherein:

PE=—$CH_2CH_2CH_2O(EO)_n(PO)_oZ$

Me=a methyl group

EO=an ethyleneoxy group

PO=1,2-propyleneoxy group

Z=H or a lower alkyl radical y=an integer ranging from about 1 to about 10.

m=an integer ranging from about 1 to about 10.

n=an integer ranging from about 0 to about 5 and o=an integer ranging from about 0 to about 5.

The surfactant generally has a number average molecular weight ranging from about 800 to about 5000 $MW_N$, most commonly from about 1000 to about 4000 $MW_N$. Representative structures include the following:

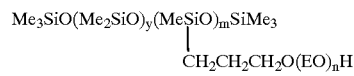

which is available from CK Witco of Greenwich, Conn. under the tradename SILWET L-7604; and

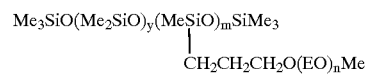

which is available from CK Witco of Greenwich, Conn. under the trade name SILWBT L-7607, wherein Me, EO, y, m and n are as defined above. The polysiloxane surfactant is typically present in the coating composition in an amount ranging from about 0.25 to about 2.0 parts by weight of the total weight of the formulation.

The balance of the coating composition is generally water, such as deionized water, present in an amount of from about 0 to about 40 parts by weight water, most commonly from about 15 to about 30 parts by weight water.

Coating formulations which have been observed to be well-suited for being treated in accordance with the invention are shown in Tables 1–3 below. In each of the Tables 1–3, the components initially treated to remove undesirable substances are the polymers available from Cytec Industries and referred to as E-4217, or SUPERFLOC C-567 or SUPERFLOC C-572.

TABLE 1

| Component | Amount (wt. %) |
| --- | --- |
| E-4217 (cationic amine polymer from Cytec Industries, Inc.) | 10.0 |
| calcium chloride dihydrate | 7.35 |
| deionized water | 17.4 |
| Glycerol | 5.0 |
| 1,2 propanediol | 42.9 |
| di(propylene glycol) | 14.3 |
| SILWET L-7607 | 1.0 |
| NALCO 8337[1] | 2.0 |
| BES free acid buffering agent[2] | 0.05 |

[1]NALCO 8337 is a corrosion inhibitor available from Nalco Chemical Company, Inc. of Naperville, Illinois.
[2]BES free acid buffering agent is N,N-bis(2-hydroxyethyl)-2-aminoethanesulfonic acid. The glycerol is a relatively non-volatile humectant which serves to inhibit evaporation of solvent from the formulation so as to enhance the storage stability of the formulation.

Other examples of coating formulations which have been observed to be treatable in accordance with the invention are listed in the following tables.

TABLE 2

| Component | Amount (wt. %) | Amount (wt. %) |
| --- | --- | --- |
| SUPERFLOC C-567 | 14.5 | 14.5 |
| magnesium acetate tetrahydrate | 25.0 | — |
| calcium acetate hydrate | — | 4.5 |
| deionized water | 11.5 | 19.5 |
| SILWET (L-7600, L-7604 OR L-7607) | 1.0 | 1.0 |
| 1,2 propanediol | 48.0 | 45.5 |
| di(propylene glycol) | — | 15 |

TABLE 3

| Component | Amount (wt. %) | Amount (wt. %) |
| --- | --- | --- |
| Calcium chloride dihydrate | 0.25 | 0.25 |
| SUPERFLOC (C-567, E-4217 or C-572) | 1.0 | 1.0 |
| deionized water | 72.5 | 72.0 |
| SILWET L-7604 | — | 0.5 |
| 1,2 propanediol | — | 26.25 |
| di(propylene glycol) | 26.25 | — |

After initial treatment of the amine polymer component, the components are normally mixed by stirring the components together in a suitable container, preferably in the order of (1) water, (2) amine polymer, (3) salt or organic acid, (4) surfactant and (5) glycol-based solvent(s) solvent.

The Method of the Invention

It has been observed that the amine polymers of the type described above include a variety of undesirable substances. For example, dimethylamine (DMA) is generally present. The presence of DMA is undesirable because DMA is volatile at room temperature (e.g., between about 60 and 80° F.) and evolves as a gas having a generally unpleasant "fishy" odor. Other undesirable substances typically include epichlorohydrin (EPI) and chlorinated hydrocarbons such as glycidol and chloro and dichloro propanols.

The method of the invention includes the following steps:
1) determining the nature and amount of undesirable substances in the coating amine polymer component of the formulation,
2) adjusting the pH of the component,
3) contacting the pH adjusted component with a first activated carbon material,
4) filtering the thus treated component,
5) contacting the thus treated component with a second activated carbon material,
6) filtering the thus treated component and then combining it with the other components of the coating formulation to yield a treated coating formulation having a reduced amount of the undesirable substances.

It will be understood that while one or two carbon-contacting steps are preferred, one or more additional carbon-contacting steps may further be performed, preferably between steps (5) and (6).

Undesirable substances such as chlorinated hydrocarbons and the like may be identified and quantified by gas chromatography using organic solvent extraction. For example, the residues may be extracted from a sample using a chloroform/isopropyl alcohol mixture and quantitated with calibration curves from external standards. Undesirable substances such as dimethylamine (DMA) may be quantified by gas chromatography/mass spectrometry using solid-phase microextraction techniques. Data may be extracted using ion current profile and standard method of addition analyses.

It has been observed that the components to be treated are generally acidic, having a pH of from about 6.0 to about 7.0. It has been discovered that particularly desirable results may be obtained for such coating formulations by first raising the pH to a pH of from about 8.0 to about 9.0. A preferred manner of adjusting the pH is by adding a strong base such as sodium hydroxide, in an amount sufficient to yield the desired pH. For example, it is preferred to add about 0.3% (wt/wt) sodium hydroxide pellets, NaOH(s) to the formulation (or the aqueous polymer) with agitation. Once the NaOH is dissolved, the pH is measured using standard pH meter/electrode such as an Orion Research pH meter, model 611 and Orion Research pH probe. If the pH is not in the desired range, additional aliquots of NaOH may be added, preferably in 0.1% (wt/wt) increments until the desired pH is reached. It is preferable that the total NaOH concentration not exceed about 0.6% (wt/wt).

The pH adjusted component may then be contacted with an activated carbon composition as by introducing the formulation into a vessel charged with the activated carbon composition. The vessel is preferably stirred or otherwise agitated to promote mixing. The agitation is preferably maintained for a period of time of from about 60 to about 120 minutes, with the temperature of the contents of the vessel preferably maintained at a temperature of from about 65° F. to about 90° F.

A preferred activated carbon composition is a powdered activated carbon available under the tradename DARCO S-51HF from Norit Americas, Inc. of Atlanta, Ga. The carbon is preferably added in an amount of from about 0.5% to about 2.0% (wt/wt), most preferably about 1% (wt/wt).

Following this, the component/carbon mixture is filtered to separate the solids, primarily carbon particles or powder, from the liquids. This may be accomplished as by use of conventional filtration equipment, preferably filtration equipment utilizing microporous membranes having a positive pressure applied thereto to draw the liquids through the membrane. Such equipment is preferably operated to apply a positive pressure of from about 25 to about 60 psi to the membrane. Preferred filtration equipment is that which is capable of filtering down to about 1 micron and may involve the use diatomaceous filter aids such as Celite (High Flow) available from Celite Corporation in Lompoc, Calif.

The foregoing steps of contacting the component of the formulation with an activated carbon and then filtering the liquids from the solids is then preferably repeated, yielding the treated component, having substantially reduced amounts of undesirable substances. This component is then preferably combined with the other components as described above to yield a coating formulation having substantially reduced amounts of undesirable substances and odor characteristics.

EXAMPLE 1

The Superfloc E-4217 component for a preferred coating formulation was analyzed and found to have the following undesirable components in parts per million (ppm).

| COMPONENT | PPM |
|---|---|
| DMA | 332 |
| EPI | 2.8 |
| Glycidol | 4.3 |
| 1,3-dichloro-2-propanol | 312 |
| 2,3-chloro-1,2-propanediol | 63 |
| 3-chloro-1,2-propanediol | 63 |

The initial pH of the component was 6.2. The pH was raised to 9 by addition of 0.3% (wt/wt) NaOH sodium hydroxide. DARCO S-51HF powdered activated carbon was then added to the pH adjusted component at a 1% (wt/wt) dosage. The mixture was stirred for 1.5 hours at ambient conditions of 72–80° F. Following this, the mixture was filtered using a stacked membrane filtration assembly down to 1.2 micron having a positive pressure of about 45 psi applied thereto. The mixture was thereafter, in the same manner and amounts, contacted again with activated carbon and filtered, yielding a component substantially reduced of the undesirable components, as follows:

| COMPONENT | PPM |
|---|---|
| DMA | <10 |
| EPI | Not detectable |
| Glycidol | Not detectable |
| 1,3-dichloro-2-propanol | Not detectable |
| 2,3-dichloro-1-propanol | Not detectable |
| 3-chloro-1,2-propanediol | Not detectable |

Coating compositions made in accordance with the invention may be applied to a web by a variety of methods including spraying and roll coating, reverse roll coating and the like. It is particularly preferred to apply the coating composition to the web immediately prior to printing so that the web is wet with the coating composition. Accordingly, application of the coating composition to a sheet or web immediately prior to printing using a reverse roll coater is particularly preferred. The coating composition may also be applied to the web by thermal jet ejectors similar to the ejectors used for ink. The amount of coating composition applied to the web preferably ranges from about 0.08 milligrams per square centimeter (mg/cm$^2$) to about 0.25 mg/cm$^2$.

Typically ink is applied to a web in an amount ranging from about 1 to about 2 mg/cm$^2$. Accordingly, it is preferred that the ratio of ink to coating composition on the web range from about 4:1 to about 25:1 parts by weight ink to part by weight coating composition. It is also preferred that the coating composition be applied in close proximity to the printhead of the ink jet printer so that the web remains relatively damp for acceptance of ink ejected from the ink jet printhead. The term "relatively damp" means that the web surface contains sufficient coating composition to enhance the penetration rate of the ink carrier into the web.

The inks which have been observed to be particularly suitable for use with coating compositions treated in accordance with the invention include a wide variety of inks containing pigment or dye colorants. Representative ink formulations include the following as set forth in Tables 4 and 5:

TABLE 4

BLACK INK

| Component | Amount (wt. %) |
|---|---|
| carbon black | 4 |
| Polyethylene glycol (PEG 1000) | 5 |
| 2-pyrrolidone | 5 |
| Thiodiethanol | 5 |
| 1,2-hexanediol | 0.5 |
| Deionized water | 98.5 |

TABLE 5

| | Amount (wt. %) | | |
|---|---|---|---|
| Component | Cyan | Magenta | Yellow |
| DIRECT BLUE 199[1] | 3 | — | — |
| LEXMARK 93A[2] | — | 3 | — |
| Acid yellow 23 | — | — | 3 |
| 2-pyrrolidone | 7.5 | 7.5 | 7.5 |
| tetraethylene glycol | 12.5 | 12.5 | 12.5 |
| 1,2-hexanediol | 4 | 4 | 4 |
| PROXEL GXL[3] | 0.2 | 0.2 | 0.2 |
| HAMPENE Na3T[4] | 0.1 | 0.1 | 0.1 |
| sodium tetraborate | 0.2 | 0.2 | 0.2 |
| SILWET L-7607[5] | 0.5 | 0.5 | — |
| SILWET L-7600[5] | — | — | 0.5 |
| deionized water | 71.1 | 71.1 | 71.1 |

[1]Direct Blue 199 is a cyan dye available from Avecia, Inc. of Wilmington, Delaware.
[2]LEXMARK 93A is a magenta dye available from Lexmark International of Lexington, Kentucky.
[3]PROXEL GXL is biocide available from Avecia, Inc. of Wilmington, Delaware.
[4]HAMPENE Na3T is chelating agent available from HVC of Cincinnati, Ohio.
[5]SILWET is a polysiloxane surfactant available from CK Witco of Greenwich, Connecticut.

It is contemplated, and will be apparent to those skilled in the art from the foregoing specification that modifications and/or changes may be made in the embodiments of the invention. Accordingly it is expressly intended that the foregoing are only illustrative of the preferred embodiments and is not limiting thereto and that the true spirit and scope of the present invention be determined by reference to the appended claims.

What is claimed is:

1. A method of treating one or more components of a coating formulation containing two or more of said components to remove undesirable substances from the one or more component prior to introducing the coating formulation onto a web to be printed by an ink jet printer, the method comprising the steps of:

a) determining the nature and amount of undesirable substances in the one or more components of the coating formulation, b) adjusting the pH of each of the one or more components having the undesirable substances, c) contacting each pH adjusted one or more components with a first activated carbon material, d) filtering each treated one or more components, e) contacting each of the thus treated one or more components with a second activated carbon material, and f) filtering each of the thus treated components and combining same with treated and untreated components of the coating formulation to yield a treated coating formulation having a reduced amount of the undesirable substances.

2. The method of claim 1, wherein at least one of the one or more components of the coating formulation having undesirable substances and to be treated comprises an aqueous polymer derived from epichlorohydrin and dimethylamine.

3. The method of claim 2, wherein the step of determining the nature and amount of undesirable substances comprises determining the amount of dimethylamine, epichlorohydrin and chlorinated hydrocarbons.

4. The method of claim 2, wherein the step of adjusting the pH comprises raising the pH.

5. The method of claim 2, wherein the step of adjusting the pH comprises adjusting the pH to a range of from about 8.0 to about 9.0.

6. The method of claim 2, wherein the step of contacting the component with a first activated carbon material comprises introducing the component into a vessel charged with an activated carbon composition, and maintaining the charged vessel under conditions of agitation for a period of time of from about 60 to about 120 mins.

7. The method of claim 2, wherein the step of filtering comprises pressure filtration.

8. A method of treating at least one component of a coating formulation containing two or more components to remove undesirable substances from the at least one component prior to introducing the coating formulation onto a web to be printed by an ink jet printer, the method comprising the steps of determining the nature and amount of undesirable substances in at least one component of the coating formulation, adjusting the pH of the at least one component, contacting the pH adjusted component with an activated carbon material, filtering the thus treated component and combining the treated and filtered component with treated and untreated components of the coating formulation to yield a treated coating formulation having a reduced amount of undesirable substances.

9. The method of claim 8, wherein the step of adjusting the pH comprises adjusting the pH to a pH of from about 8.0 to about 9.0.

10. The method of claim 9, wherein the step of contacting the component with an activated carbon material comprises contacting the component with activated carbon material present in an amount of from about 0.5 to about 2.0% (wt/wt).

11. A method for reducing an amount of undesirable constituents in one or more components of a coating formulation containing a polyamine component as one of the components to provide a coating formulation having a substantially undetectable odor and less than about 1 ppm chlorinated compounds therein, the method comprising the steps of:

(a) adjusting the pH of the polyamine component to a pH in the range of from about 0.8 to about 9.0.

(b) contacting the pH adjusted component with an activated carbon material present in an amount of from about 0.5 to about 2.0% (wt/wt).

(c) filtering the thus treated component and combining it with treated and untreated components of the coating formulation to yield a treated coating formulation having a substantially undetectable odor and less than about 1 ppm chlorinated compounds.

* * * * *